S. E. WINDER.
ICE CREAM CONE MOLDING MECHANISM.
APPLICATION FILED APR. 1, 1920.

1,413,369.

Patented Apr. 18, 1922.
2 SHEETS—SHEET 1.

Inventor
Samuel E. Winder
Andrews & Lindell
Attys.

S. E. WINDER.
ICE CREAM CONE MOLDING MECHANISM.
APPLICATION FILED APR. 1, 1920.

1,413,369.

Patented Apr. 18, 1922.
2 SHEETS—SHEET 2.

Inventor
Samuel E. Winder
Andrews & Lundell
Attys

UNITED STATES PATENT OFFICE.

SAMUEL E. WINDER, OF CHICAGO, ILLINOIS, ASSIGNOR TO NOVELTY CUP & CONE COMPANY, OF CHICAGO, ILLINOIS, A CORPORATION OF ILLINOIS.

ICE-CREAM-CONE-MOLDING MECHANISM.

1,413,369.  Specification of Letters Patent.  Patented Apr. 18, 1922.

Application filed April 1, 1920. Serial No. 370,606.

*To all whom it may concern:*

Be it known that I, SAMUEL E. WINDER, a citizen of the United States, residing at Chicago, in the county of Cook and State of Illinois, have invented certain new and useful Improvements in Ice-Cream-Cone-Molding Mechanism, of which the following is a specification.

This invention relates to ice-cream cone molding mechanism, and has for its object the production of improved mechanism for making ice-cream cones by molding the batter in flat sheets and then rolling the sheets into cones instead of by molding the completed cones. It has been common in the past to make ice-cream cones by pressing batter into the form of a round disk, and then rolling the cone into the well known conical shape, and properly baking the batter at a suitable time. But it has been found that in the manufacture of cones in this manner the upper edge of the cone does not present a pleasing appearance, as it is more or less jagged and uneven, and has not a well defined flange thereon. One object of this invention is to produce a suitable machine for forming cones in this way, and, at the same time, forming a rim on the top thereof which will have a more pleasing appearance than the ordinary cones of this shape.

Figure 1:
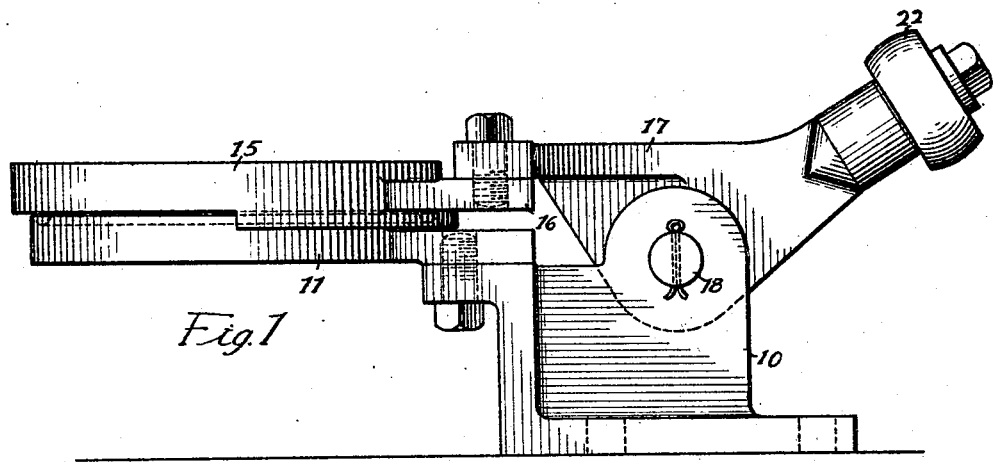
Figure 2:
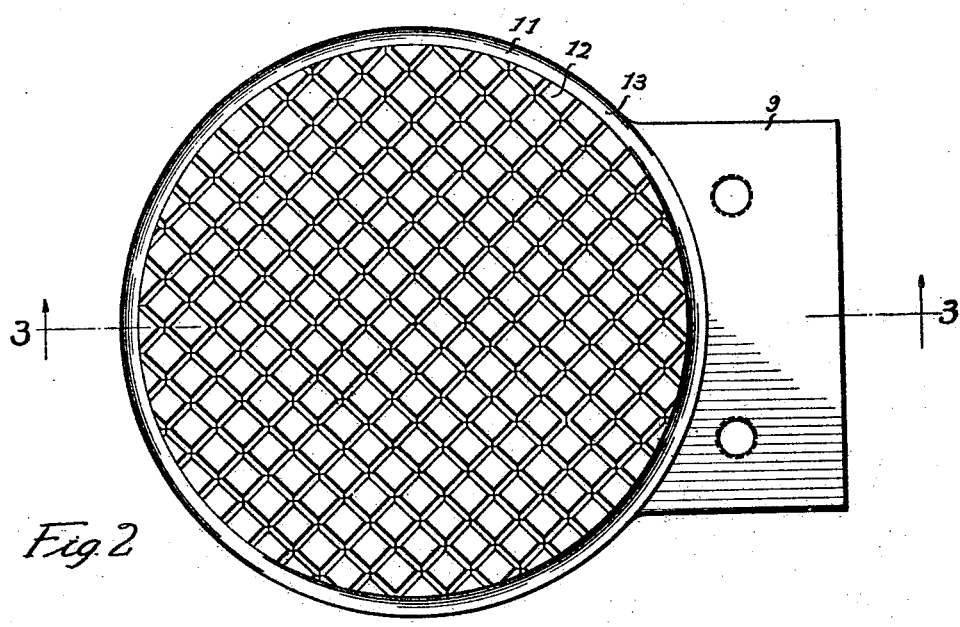
Figure 3:
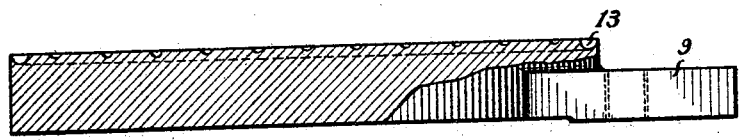
Figure 4:
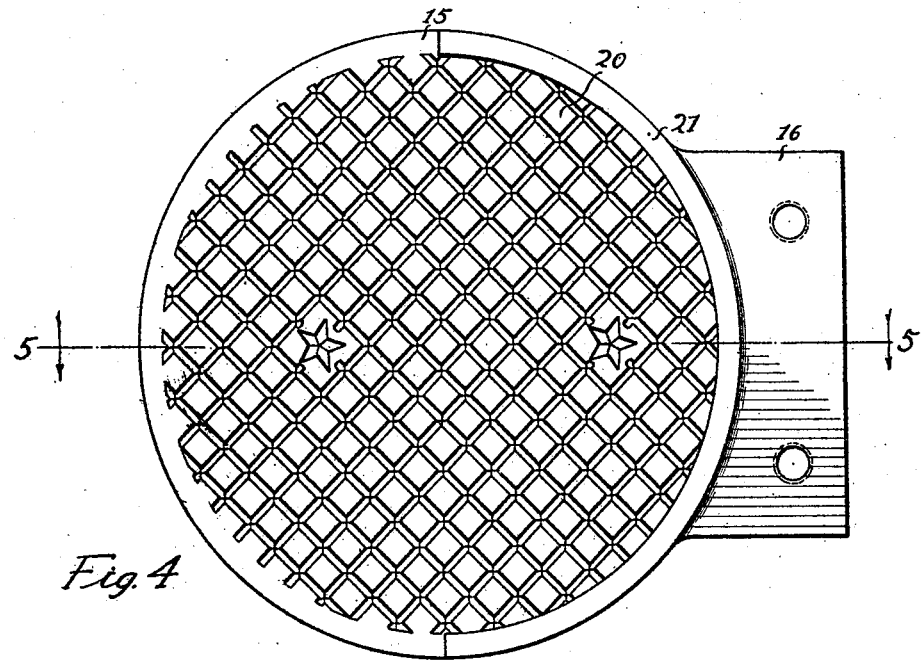
Figure 5:
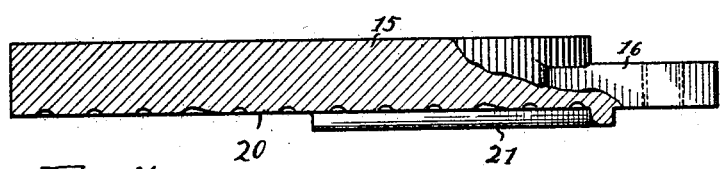

Of the accompanying drawings Fig. 1 is an elevation of a device used in the manufacturing of the cones, which embodies features of my invention; Fig. 2 is a plan view of one element of the device; Fig. 3 is a central sectional view along the line 3—3 of Fig. 2; Fig. 4 is a plan view of another element of the device; Fig. 5 is a sectional view along the line 5—5 of Fig. 4; and Fig. 6 is an elevation of a completed cone.

Figure 6:
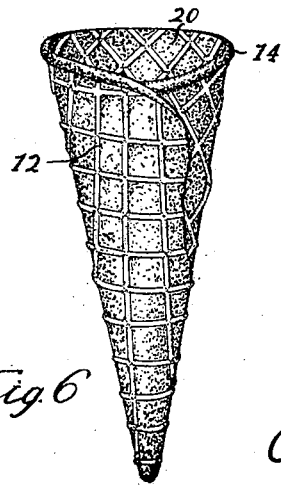

In the manufacture of cones similar to the one illustrated in Fig. 6, I provide, as my preferred mechanism, a base 10 to which is fixed a plate 11, fixed by an arm 9 to the base, and having any desired form of figure on its upper surface, such as the squares 12, which provides a mold for forming the outer surface of the completed cones. The plate also has an annular groove 13 around its edge, which is provided to mold into shape the upper rim 14 of the cone. The upper plate of the device comprises a disk 15 fixed, by an arm 16, to a lever 17, which is pivoted by the pin 18 to the base 10 of the device. This plate has figures of any suitable shape, such as the squares 20, on its under surface to form the inner surface of the completed cone; and it has a flange 21 projecting downwardly from the rear edge, and extending substantially halfway around the edge of the plate, the flange being adapted, when the plate is turned downwardly on the lower plate 11, to fit snugly against the edge of the plate 11, as indicated in Fig. 1.

In operation the rear arm of the lever 17 is pressed downwardly in any suitable manner, and the plate 15 is thereby elevated out of the way. The prepared batter, which is to form the cone, is then placed on the plate 11, near the rear portion thereof. The plate 15 is then turned downwardly onto the batter, and the batter is pressed into a thin disk-like shape, the flange 21 on the rear of the plate 16, as the plate descends, fits snugly against the rear of the plate 11, and allows the batter to pass rearwardly into the groove 13 and completely fill the groove, but prevents it running over the rear edge of the plate. At the same time the batter is pressed forwardly so as to substantially cover the plate 11. By having the center of the pivot 18 positioned materially below the upper surface of the plate 11, it is evident that the rear end of the plate 15 first comes in contact with the plate 11, thus snugly closing the rear edge of the molding means by the flange 21, but leaving the forward portion of the molding means spaced a material distance apart so that the batter is forced forwardly as soon as the rear portion is filled; thus insuring the filling of the groove 13, and at the same time forcing all of the surplus batter forwardy to complete the disk-like shape.

While in the mold thus formed the batter is cooked sufficiently, and is then removed and quickly rolled into cone shape in any suitable manner. The particular manner in which the rolling is done is not a part of this invention, and hence has not been illustrated. Any suitable means may be provided for operating the lever 17 at proper times. The means which I provide comprises a machine, which has a cam arrangement which at suitable times operates upon the roller 22 and forces the roller so as to properly raise the plate 15. When it is desired to lower the plate the roller 22 passes from under the cam and the plate by its own weight sinks and properly molds the batter. Inasmuch as the mechanism for operating the lever is no part of the present invention, I have not illustrated the same.

As indicated by Fig. 6, only a portion of the edge of the molded batter forms the upper edge of the cone. Hence it is necessary to fill with batter only the rear portion of the groove 13. The forward portion of the groove is formed in the plate when machining the rear portion, but ordinarily it is not used.

I claim as my invention:

1. Batter molding mechanism, comprising a lower plate and an upper plate, said lower plate having a marginal groove around a portion of its edge, a flange projecting angularly from a portion of the edge of the upper plate, and a base, the lower plate being fixed to said base and the upper plate being pivoted to said base and positioned thereon so that said flange will be adjacent to said groove when the upper plate is turned down adjacent said fixed plate.

2. In an ice cream cone molding mechanism two molding plates, and means comprising a pivot for pivoting said plates together so that, when closed towards each other, the opposing plane surfaces will come parallel and adjacent, the said pivot being positioned a material distance away from the plane of said plates when so closed, one of said plates having a marginal groove on one portion of its edge, and the other plate having a flange on its corresponding edge and arranged to enclose the groove portion of the edge of the other plate when said plates are closed.

In testimony whereof, I hereunto set my hand.

SAMUEL E. WINDER.